US012775258B2

(12) United States Patent
Tuyls et al.

(10) Patent No.: US 12,775,258 B2
(45) Date of Patent: Oct. 27, 2026

(54) INSTRUCTION GENERATION AND PROGRAMMING MODEL FOR A DATA PROCESSING ARRAY AND MICROCONTROLLER

(71) Applicant: Xilinx, Inc., San Jose, CA (US)

(72) Inventors: Jorn Tuyls, Leinster (IE); Xiao Teng, Cupertino, CA (US); Sanket Pandit, San Jose, CA (US); Rajeev Patwari, San Jose, CA (US); Qian Zhou, Beijing (CN); Ehsan Ghasemi, San Jose, CA (US); Ephrem C. Wu, San Mateo, CA (US); Elliott Delaye, San Jose, CA (US); Aaron Ng, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 1093 days.

(21) Appl. No.: 17/823,902

(22) Filed: Aug. 31, 2022

(65) Prior Publication Data

US 2024/0069511 A1 Feb. 29, 2024

(51) Int. Cl.
*G05B 19/042* (2006.01)

(52) U.S. Cl.
CPC .. *G05B 19/042* (2013.01); *G05B 2219/25255* (2013.01); *G05B 2219/25257* (2013.01)

(58) Field of Classification Search
CPC ........ G05B 19/042; G05B 2219/25255; G05B 2219/25257; G06N 3/045; G06N 3/105; G06N 3/063
See application file for complete search history.

(56) References Cited

U.S. PATENT DOCUMENTS

| | | | |
|---|---|---|---|
| 2,204,687 | A | 6/1940 | Little |
| 3,776,137 | A | 12/1973 | Abbott |

(Continued)

FOREIGN PATENT DOCUMENTS

| | | |
|---|---|---|
| WO | 2019195132 | 10/2019 |
| WO | 2019195309 | 10/2019 |
| WO | 2019195343 | 10/2019 |

OTHER PUBLICATIONS

Ansor: Generating High-Performance Tensor Programs for Deep Learning, Nov. 2020, pp. 1-18 (Year: 2020).*

(Continued)

*Primary Examiner* — Kevin L Young
*Assistant Examiner* — Phuong N Hoang
(74) *Attorney, Agent, or Firm* — Kevin T. Cuenot

(57) ABSTRACT

Instruction generation for a data processing array and microcontroller includes generating a tensor-level intermediate representation from a machine learning model using kernel expressions. Statements of the tensor-level intermediate representation are partitioned into a first set of statements and a second set of statements. From the first set of statements, kernel instructions are generated based on a reconfigurable neural engine model. The kernel instructions are executable by a compute tile of a data processing array to implement compute functions of the machine learning model. From the set of second statements, microcontroller instructions are generated based on a super-graph model. The microcontroller instructions are executable by a microcontroller of the data processing array to move data into and out from the data processing array.

20 Claims, 8 Drawing Sheets

(56) References Cited

U.S. PATENT DOCUMENTS

| | | | |
|---|---|---|---|
| 4,876,641 | A | 10/1989 | Cowley |
| 6,091,263 | A | 7/2000 | New et al. |
| 6,150,839 | A | 11/2000 | New et al. |
| 6,204,687 | B1 | 3/2001 | Schultz et al. |
| 6,462,579 | B1 | 10/2002 | Camilleri et al. |
| 6,526,557 | B1 | 2/2003 | Young et al. |
| 6,759,869 | B1 | 7/2004 | Young et al. |
| 6,781,407 | B2 | 8/2004 | Schultz |
| 6,810,514 | B1 | 10/2004 | Alfke et al. |
| 6,836,842 | B1 | 12/2004 | Guccione et al. |
| 6,907,595 | B2 | 6/2005 | Curd et al. |
| 7,024,651 | B1 | 4/2006 | Camilleri et al. |
| 7,057,413 | B1 | 6/2006 | Young et al. |
| 7,124,338 | B1 | 10/2006 | Mark et al. |
| 7,185,309 | B1 | 2/2007 | Kulkarni et al. |
| 7,199,608 | B1 | 4/2007 | Trimberger |
| 7,224,184 | B1 | 5/2007 | Levi et al. |
| 7,281,093 | B1 | 10/2007 | Kulkarni et al. |
| 7,301,822 | B1 | 11/2007 | Walstrum, Jr. et al. |
| 7,302,625 | B1 | 11/2007 | Payakapan et al. |
| 7,328,335 | B1 | 2/2008 | Sundararajan et al. |
| 7,380,035 | B1 | 5/2008 | Donlin |
| 7,394,288 | B1 | 7/2008 | Agarwal |
| 7,420,392 | B2 | 9/2008 | Schultz et al. |
| 7,454,658 | B1 | 11/2008 | Baxter |
| 7,477,072 | B1 | 1/2009 | Kao et al. |
| 7,478,357 | B1 | 1/2009 | Mason et al. |
| 7,482,836 | B2 | 1/2009 | Levi et al. |
| 7,500,060 | B1 | 3/2009 | Anderson et al. |
| 7,509,617 | B1 | 3/2009 | Young |
| 7,518,396 | B1 | 4/2009 | Kondapalli et al. |
| 7,521,961 | B1 | 4/2009 | Anderson |
| 7,539,845 | B1 | 5/2009 | Wentzlaff et al. |
| 7,546,572 | B1 | 6/2009 | Ballagh et al. |
| 7,574,680 | B1 | 8/2009 | Kulkarni et al. |
| 7,576,561 | B1 | 8/2009 | Huang |
| 7,619,442 | B1 | 11/2009 | Mason et al. |
| 7,640,527 | B1 | 12/2009 | Dorairaj et al. |
| 7,650,248 | B1 | 1/2010 | Baxter |
| 7,653,820 | B1 | 1/2010 | Trimberger |
| 7,689,726 | B1 | 3/2010 | Sundararajan et al. |
| 7,724,815 | B1 | 5/2010 | Raha et al. |
| 7,746,099 | B1 | 6/2010 | Chan et al. |
| 7,774,579 | B1 | 8/2010 | Wentzlaff |
| 7,788,625 | B1 | 8/2010 | Donlin et al. |
| 7,831,801 | B1 | 11/2010 | Anderson |
| 8,006,021 | B1 | 8/2011 | Li et al. |
| 8,020,163 | B2 | 9/2011 | Nollet et al. |
| 8,045,546 | B1 | 10/2011 | Bao et al. |
| 8,102,188 | B1 | 1/2012 | Chan et al. |
| 8,214,694 | B1 | 7/2012 | McKechnie et al. |
| 8,250,342 | B1 | 8/2012 | Kostamov et al. |
| 8,359,448 | B1 | 1/2013 | Neuendorffer |
| 8,415,974 | B1 | 4/2013 | Lysaght |
| 8,656,141 | B1 | 2/2014 | Agarwal |
| 8,719,750 | B1 | 5/2014 | Balzli, Jr. |
| 8,796,539 | B2 | 8/2014 | Asaumi et al. |
| 8,928,351 | B1 | 1/2015 | Konduru |
| 9,081,634 | B1 | 7/2015 | Simkins et al. |
| 9,152,794 | B1 | 10/2015 | Sanders et al. |
| 9,165,143 | B1 | 10/2015 | Sanders et al. |
| 9,218,443 | B1 | 12/2015 | Styles et al. |
| 9,230,112 | B1 | 1/2016 | Peterson et al. |
| 9,323,876 | B1 | 4/2016 | Lysaght et al. |
| 9,336,010 | B2 | 5/2016 | Kochar et al. |
| 9,411,688 | B1 | 8/2016 | Poolla et al. |
| 9,436,785 | B1 | 9/2016 | Javre |
| 9,639,487 | B1 | 5/2017 | Wentzlaff |
| 9,652,252 | B1 | 5/2017 | Kochar et al. |
| 9,652,410 | B1 | 5/2017 | Schelle et al. |
| 9,722,613 | B1 | 8/2017 | Schultz et al. |
| 9,990,241 | B2 | 6/2018 | Dobbs |
| 10,243,882 | B1 | 3/2019 | Swarbrick |
| 10,505,548 | B1 | 12/2019 | Swarbrick |
| 10,673,439 | B1 | 6/2020 | Ahmad |
| 10,673,745 | B2 | 6/2020 | Swarbrick |
| 10,747,690 | B2 | 8/2020 | Bilski |
| 10,783,603 | B2 | 9/2020 | Venkatesh |
| 10,802,807 | B1 | 10/2020 | Hsu |
| 10,824,505 | B1 | 11/2020 | Swarbrick |
| 10,824,584 | B1 | 11/2020 | Noguera Serra |
| 10,838,908 | B2 | 11/2020 | Swarbrick |
| 10,866,753 | B2 | 12/2020 | Noguera Serra et al. |
| 10,909,418 | B2 | 2/2021 | Lee |
| 10,963,421 | B1 | 3/2021 | Swarbrick |
| 11,113,030 | B1 | 9/2021 | Monga |
| 11,163,605 | B1 | 11/2021 | Santan |
| 11,204,745 | B2 | 12/2021 | Gupta |
| 11,204,976 | B2 | 12/2021 | Ross |
| 11,263,064 | B2 | 3/2022 | Gangani |
| 11,531,873 | B2 | 12/2022 | Boesch |
| 11,593,547 | B1 | 2/2023 | Petrica |
| 11,620,491 | B2 | 4/2023 | Wang |
| 11,809,514 | B2 | 11/2023 | Ross |
| 2004/0114609 | A1 | 6/2004 | Swarbrick et al. |
| 2004/0210695 | A1 | 10/2004 | Weber et al. |
| 2007/0006137 | A1 | 1/2007 | Savagaonkar |
| 2007/0124565 | A1 | 5/2007 | Jones |
| 2008/0082759 | A1 | 4/2008 | Pong |
| 2008/0320255 | A1 | 12/2008 | Wingard et al. |
| 2008/0320268 | A1 | 12/2008 | Wingard et al. |
| 2012/0036296 | A1 | 2/2012 | Wingard et al. |
| 2012/0310983 | A1 | 12/2012 | Mittal |
| 2014/0006751 | A1 | 1/2014 | Aliseychik et al. |
| 2014/0267334 | A1 | 9/2014 | Duluk, Jr. |
| 2016/0011996 | A1 | 1/2016 | Asaad et al. |
| 2017/0140800 | A1 | 5/2017 | Wingard et al. |
| 2017/0220499 | A1 | 8/2017 | Gray |
| 2017/0315944 | A1 | 11/2017 | Mayer et al. |
| 2018/0012637 | A1 | 1/2018 | Krishna |
| 2019/0155666 | A1 | 5/2019 | Dobbs |
| 2019/0205263 | A1 | 7/2019 | Fleming |
| 2019/0205269 | A1 | 7/2019 | Fleming, Jr. |
| 2019/0238453 | A1 | 8/2019 | Swarbrick et al. |
| 2019/0266125 | A1 | 8/2019 | Swarbrick et al. |
| 2019/0303033 | A1 | 10/2019 | Noguera Serra et al. |
| 2019/0303311 | A1 | 10/2019 | Bilski et al. |
| 2019/0303323 | A1 | 10/2019 | Swarbrick et al. |
| 2019/0303328 | A1 | 10/2019 | Bilski et al. |
| 2020/0234124 | A1 | 7/2020 | Park |
| 2020/0311617 | A1 | 10/2020 | Swan |
| 2021/0390460 | A1* | 12/2021 | Nimmagadda ..... G06F 18/2163 |
| 2022/0092736 | A1 | 3/2022 | Liu |
| 2022/0197854 | A1 | 6/2022 | Aal |
| 2022/0207656 | A1 | 6/2022 | Yao |
| 2022/0284271 | A1 | 9/2022 | Park |
| 2022/0343137 | A1* | 10/2022 | Surendran .............. G06N 3/044 |
| 2022/0391702 | A1* | 12/2022 | Lin .......................... G06N 3/08 |
| 2023/0004365 | A1* | 1/2023 | Hanebutte ................. G06F 8/44 |
| 2023/0039180 | A1 | 2/2023 | Luitjens |
| 2023/0050061 | A1 | 2/2023 | Havlir |
| 2023/0083345 | A1 | 3/2023 | Kelur |
| 2023/0099608 | A1 | 3/2023 | Venkataramani |
| 2023/0185873 | A1 | 6/2023 | Espig |
| 2023/0205559 | A1 | 6/2023 | Chowdhury |
| 2023/0291406 | A1 | 9/2023 | Cochell |
| 2023/0315410 | A1* | 10/2023 | Yang ....................... G06F 17/11 717/151 |
| 2024/0028556 | A1 | 1/2024 | Pandit |

OTHER PUBLICATIONS

Han Shenquan et al.: "An approach to improving the performance of CUDA in virtual. environment", 2016 17th IEEE/ACIS International Conference on so~~ Engineering,. Artificial Intelligence, Networking and Parallel/Distributed Computing (SNPD), IEEE, May 30, 2016 (May 30, 2016), pp. 585-590.

Xilinx, Inc., "Xilinx AI Engines and Their Applications," WP506 (v1.1) Jul. 10, 2020, 13 pages.

(56) References Cited

OTHER PUBLICATIONS

Xilinx, Inc., "Versal: The First Adaptive Compute Acceleration Platform (ACAP)," WP505 (v1.1.1) Sep. 29, 2020, 21 pages.

* cited by examiner

INSTRUCTION GENERATION AND PROGRAMMING MODEL FOR A DATA PROCESSING ARRAY AND MICROCONTROLLER

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to generating instructions for an acceleration system that includes a data processing array and a microcontroller for the data processing array.

BACKGROUND

Deep learning refers to a subset of machine learning. To accomplish a given task, deep learning utilizes artificial neural networks. An artificial neural network, or simply a "neural network," includes layers of interconnected nodes that are operable to categorize input data into categories of interest. In general, a neural network will include an input layer and an output layer and optionally one or more hidden layers between the input and output layers. A neural network expressed as a machine learning model used in deep learning applications typically includes many hidden layers, which gives rise to the term "deep neural network."

A machine learning model may be developed that specifies a particular neural network. Inference refers to calculating an output of the machine learning model given input data. Performing inference using a machine learning model as implemented on a hardware platform is computationally intensive and, as such, challenging to implement the machine learning model in a computationally efficient manner to provide acceptable runtime performance. Significant development effort has been devoted to executing machine learning models more efficiently on monolithic hardware platforms such as a central processing unit (CPU) or a graphics processing unit (GPU). Efficient implementation of a machine learning model on more complex hardware platforms presents even greater challenges.

SUMMARY

In one or more example implementations, a method includes generating a tensor-level intermediate representation from a machine learning model using kernel expressions. The method includes partitioning statements of the tensor-level intermediate representation into a first set of statements and a second set of statements. The method includes generating, from the first set of statements, kernel instructions based on a reconfigurable neural engine model. The kernel instructions are executable by a compute tile of a data processing array to implement compute functions of the machine learning model. The method includes generating, from the second set of statements, microcontroller instructions based on a super-graph model. The microcontroller instructions are executable by a microcontroller of the data processing array to move data into and out from the data processing array.

In one aspect, the compute tile is configured to execute a virtual machine. The virtual machine is configured to execute the kernel instructions to invoke one or more kernels of the compute tile.

In another aspect, the microcontroller is configured to execute a virtual machine. The virtual machine is configured to execute the microcontroller instructions.

In another aspect, the reconfigurable neural engine model specifies an instruction format for invoking a plurality of kernels executing in the compute tile.

In another aspect, the super-graph model specifies data movement in the data processing array.

In another aspect, the partitioning statements of the tensor-level intermediate representation includes detecting compute intrinsic calls in the statements of the tensor-level intermediate representation and including the compute intrinsic calls in the first set of statements.

In another aspect, the partitioning statements of the tensor-level intermediate representation includes detecting, in the tensor-level intermediate representation, loop constructs including a copy operation of data from one memory to another memory and including the loop constructs in the second set of statements.

In one or more example implementations, a system includes one or more processors configured to initiate operations. The operations include generating a tensor-level intermediate representation from a machine learning model using kernel expressions. The operations include partitioning statements of the tensor-level intermediate representation into a first set of statements and a second set of statements. The operations include generating, from the first set of statements, kernel instructions based on a reconfigurable neural engine model. The kernel instructions are executable by a compute tile of a data processing array to implement compute functions of the machine learning model. The operations include generating, from the second set of statements, microcontroller instructions based on a super-graph model. The microcontroller instructions are executable by a microcontroller of the data processing array to move data into and out from the data processing array.

In one aspect, the compute tile is configured to execute a virtual machine. The virtual machine is configured to execute the kernel instructions to invoke one or more kernels of the compute tile.

In another aspect, the microcontroller is configured to execute a virtual machine. The virtual machine is configured to execute the microcontroller instructions.

In another aspect, the reconfigurable neural engine model specifies an instruction format for invoking a plurality of kernels executing in the compute tile.

In another aspect, the super-graph model specifies data movement in the data processing array.

In another aspect, the partitioning statements of the tensor-level intermediate representation includes detecting compute intrinsic calls in the statements of the tensor-level intermediate representation and including the compute intrinsic calls in the first set of statements.

In another aspect, the partitioning statements of the tensor-level intermediate representation includes detecting, in the tensor-level intermediate representation, loop constructs including a copy operation of data from one memory to another memory and including the loop constructs in the second set of statements.

In one or more example implementations, a computer program product includes one or more computer-readable storage media, and program instructions collectively stored on the one or more computer-readable storage media. The program instructions are executable by computer hardware to initiate operations. The operations include generating a tensor-level intermediate representation from a machine learning model using kernel expressions. The operations include partitioning statements of the tensor-level intermediate representation into a first set of statements and a second set of statements. The operations include generating, from the first set of statements, kernel instructions based on a reconfigurable neural engine model. The kernel instructions are executable by a compute tile of a data processing array to implement compute functions of the machine learning model. The operations include generating, from the second set of statements, microcontroller instructions based on a super-graph model. The microcontroller instructions are executable by a microcontroller of the data processing array to move data into and out from the data processing array.

In one aspect, the compute tile is configured to execute a virtual machine. The virtual machine is configured to execute the kernel instructions to invoke one or more kernels of the compute tile.

In another aspect, the microcontroller is configured to execute a virtual machine. The virtual machine is configured to execute the microcontroller instructions.

In another aspect, the reconfigurable neural engine model specifies an instruction format for invoking a plurality of kernels executing in the compute tile.

In another aspect, the super-graph model specifies data movement in the data processing array.

In another aspect, the partitioning statements of the tensor-level intermediate representation includes detecting compute intrinsic calls in the statements of the tensor-level intermediate representation and including the compute intrinsic calls in the first set of statements.

In another aspect, the partitioning statements of the tensor-level intermediate representation includes detecting, in the tensor-level intermediate representation, loop constructs including a copy operation of data from one memory to another memory and including the loop constructs in the second set of statements.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

This disclosure relates to generating instructions for an acceleration system. The acceleration system includes a data processing array and a microcontroller for the data processing array. In accordance with the inventive arrangements described within this disclosure, methods, systems, and computer program products relating to compiling a machine learning (ML) model are disclosed. The inventive arrangements are capable of compiling an ML model into instructions for the data processing array and instructions for the microcontroller. That is, a set of instructions executable by the data processing array is generated and a set of instructions executable by the microcontroller is generated. The microcontroller, in executing the microcontroller instructions, is capable of controlling data flows into and out from the data processing array. The instructions for the data processing array, as executed, implement computations on the data. In this regard, the instructions generated are executable at runtime to implement the ML model on the acceleration system. For example, the acceleration system may implement the ML model and perform inference on received data by executing the generated instructions.

In one aspect, a compiler is disclosed that is capable reading an ML model and various pieces of information relating to the data processing array and accelerator system intrinsic and parameter information. The compiler is capable of mapping operations specified by the ML model to a spatial and temporal schedule that may be executed on the data processing array under control of the microcontroller. The compiler includes code generators capable of lowering the generated schedule to compute and data movement intrinsic calls to produce a set of microcontroller instruction sequences that implement different operations in the ML model. The set of microcontroller instructions also may be optimized.

Further aspects of the inventive arrangements are described below with reference to the figures.

Figure 1:
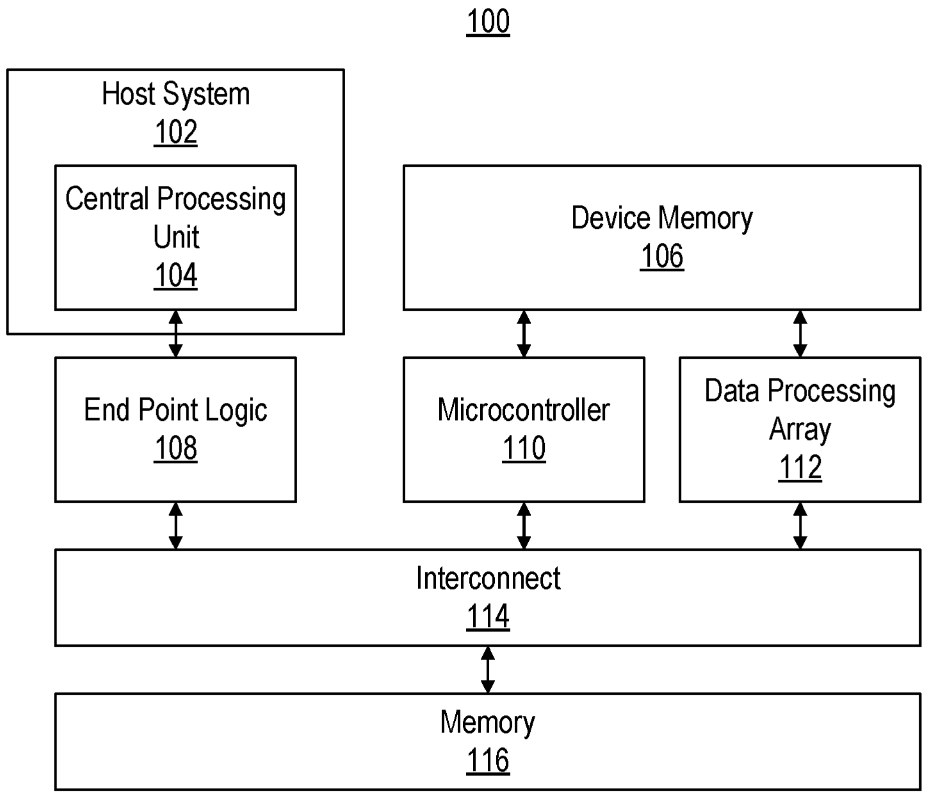
FIG. 1 illustrates an example system including a microcontroller and a data processing array.

FIG. 1 illustrates an example system 100. System 100 includes a host system 102, a device memory 106, end point logic 108, a microcontroller 110, a data processing array 112, an interconnect 114, and a memory 116. Host system 102 may be implemented as a data processing system (e.g., a computer) and includes a central processing unit (CPU) 104. An example of a data processing system is described herein in connection with FIG. 10. Microcontroller 110 and data processing array 112, taken collectively, form an accelerator system.

In the example, CPU 104 is communicatively linked to device memory 106, microcontroller 110, and data processing array 112 by way of end point logic 108. As an illustrative and non-limiting example, CPU 104 may be communicatively linked to end point logic 108 via a communication channel such as a bus. An example communication channel is a peripheral Component Interconnect Express (PCIe) communication link where end point logic 108 is a bus end point such as a PCIe end point. End point logic 108 is communicatively linked with microcontroller 110 and data processing array 112 via interconnect 114. Microcontroller 110 and data processing array 112 are capable of accessing (e.g., reading and/or writing) device memory 106 via data connections and memory 116 via interconnect 114.

In one aspect, end point logic 108, microcontroller 110, data processing array 112, interconnect 114, and memory 116 may be implemented within a single device (e.g., a single integrated circuit). Host system 102 may be coupled to the IC. As an illustrative and non-limiting example, the IC including end point logic 108, microcontroller 110, data processing array 112, interconnect 114, and memory 116 may be disposed on a circuit board that is communicatively linked with host system 102 and CPU 104. In one or more examples, device memory 106 is implemented as a memory that is external to the IC but disposed on the circuit board with the IC. In one or more other examples, device memory 106 is included in the IC. An example of device memory 106 is a Random Access Memory (RAM) such as a Double Data Rate, Synchronous Dynamic Random Access Memory or "DDR memory." In one or more other examples, device memory 106 may be implemented as a high-bandwidth memory. In general, host system 102 is capable of reading and writing device memory 106 to exchange data with the IC.

Memory 116 may represent any of a variety of on-chip RAM memories. Examples of memory 116 may include a Synchronous Dynamic Random Access Memory (SDRAM). More specific examples of memory 116 may include registers, flip-flops, lookup-table memory, block-RAMs, and the like.

Data processing array 112 is implemented as a plurality of hardwired circuit blocks. The plurality of circuit blocks may be programmable. Data processing array 112 may include a plurality of compute tiles, optionally one or more memory tiles, and a plurality of interface tiles organized in an array interface. In general, a compute tile includes a core that has data processing capabilities and a local memory. The local memory can potentially also be accessed by other cores in data processing array 112, subject to constraints. The memory tiles may be used as shared memory accessible by all cores in data processing array 112. An example implementation of data processing array 112 is described in connection with FIG. 2. Data processing array 112 may be programmed to implement one or more operations of a deep neural network.

Figure 2:
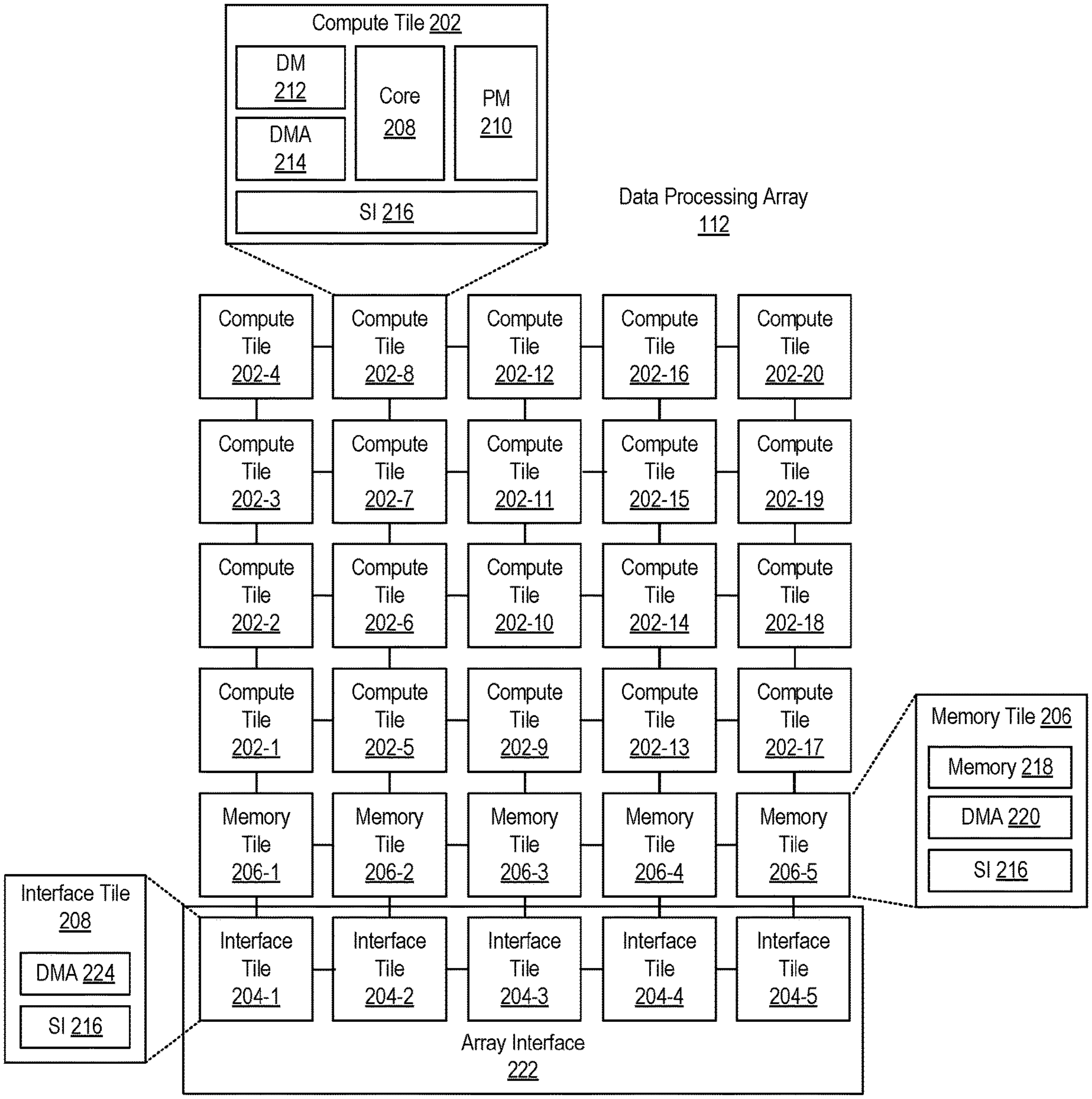
FIG. 2 illustrates an example implementation of a data processing array.

FIG. 2 illustrates an example implementation of data processing array 112. Data processing array 112 may be implemented as a plurality of interconnected tiles. The term "tile," as used herein in connection with a data processing array, means a circuit block. The interconnected tiles of data processing array 112 include compute tiles 202 and interface tiles 204. Data processing array 112 optionally includes one or more memory tiles 206. The tiles illustrated in FIG. 2 may be arranged in an array or grid and are hardwired.

Each compute tile 202 can include one or more cores 208, a program memory (PM) 210, a data memory (DM) 212, a DMA circuit 214, and a stream interconnect (SI) 216. In one aspect, each core 208 is capable of executing program code stored program memory 210. In one aspect, each core 208 may be implemented as a scalar processor, as a vector processor, or as a scalar processor and a vector processor operating in coordination with one another.

In one or more examples, each core 208 is capable of directly accessing the data memory 212 within the same compute tile 202 and the data memory 212 of any other compute tile 202 that is adjacent to the core 208 of the compute tile 202 in the up, down, left, and/or right directions. Core 208 sees data memories 212 within the same tile and in one or more other adjacent compute tiles as a unified region of memory (e.g., as a part of the local memory of the core 208). This facilitates data sharing among different compute tiles 202 in data processing array 112. In other examples, core 208 may be directly connected to data memories 212 in other compute tiles 202.

Cores 208 may be directly connected with adjacent cores 208 via core-to-core cascade connections (not shown). In one aspect, core-to-core cascade connections are unidirectional and direct connections between cores 208. In another aspect, core-to-core cascade connections are bidirectional and direct connections between cores 208. In general, core-to-core cascade connections generally allow the results stored in an accumulation register of a source core 208 to be provided directly to an input of a target or load core 208 without traversing the stream interconnect 216 (e.g., without using DMA 214) and/or being written by a first core 208 to data memory 212 to be read by a different core 208.

In an example implementation, compute tiles 202 do not include cache memories. By omitting cache memories, data processing array 112 is capable of achieving predictable, e.g., deterministic, performance. Further, significant processing overhead is avoided since maintaining coherency among cache memories located in different compute tiles 202 is not required. In a further example, cores 208 do not have input interrupts. Thus, cores 208 are capable of operating uninterrupted. Omitting input interrupts to cores 208 also allows data processing array 112 to achieve predictable, e.g., deterministic, performance.

Data processing array 112 may include one or more memory tiles 206. Memory tiles 206 include a memory 218 (e.g., a RAM), a DMA circuit 220, and a stream interconnect 216. Each memory tile 206 may read and/or write to the memory 218 of an adjacent memory tile 206 by way of the DMA included in the memory tile 206. Further, each compute tile 202 in data processing array 112 is capable of reading and writing to any one or more of memory tiles 206. Memory tiles 206 are characterized by the lack of computational components such as processors (e.g., cores 208).

Interface tiles 204 form an array interface 222 for data processing array 112. Array interface 222 operates as an interface that connects tiles of data processing array 112 to other resources of the particular IC in which data processing array 112 is disposed. In the example of FIG. 2, array interface 222 includes a plurality of interface tiles 204 organized in a row. Interface tiles 204 can include a stream interconnect 216 and a DMA circuit 224. Interface tiles 204 are connected so that data may be propagated from one interface tile to another bi-directionally. Each interface tile 204 is capable of operating as an interface for the column of tiles directly above and is capable of interfacing such tiles with components and/or subsystems of the IC including data processing array 112.

Figure 3:
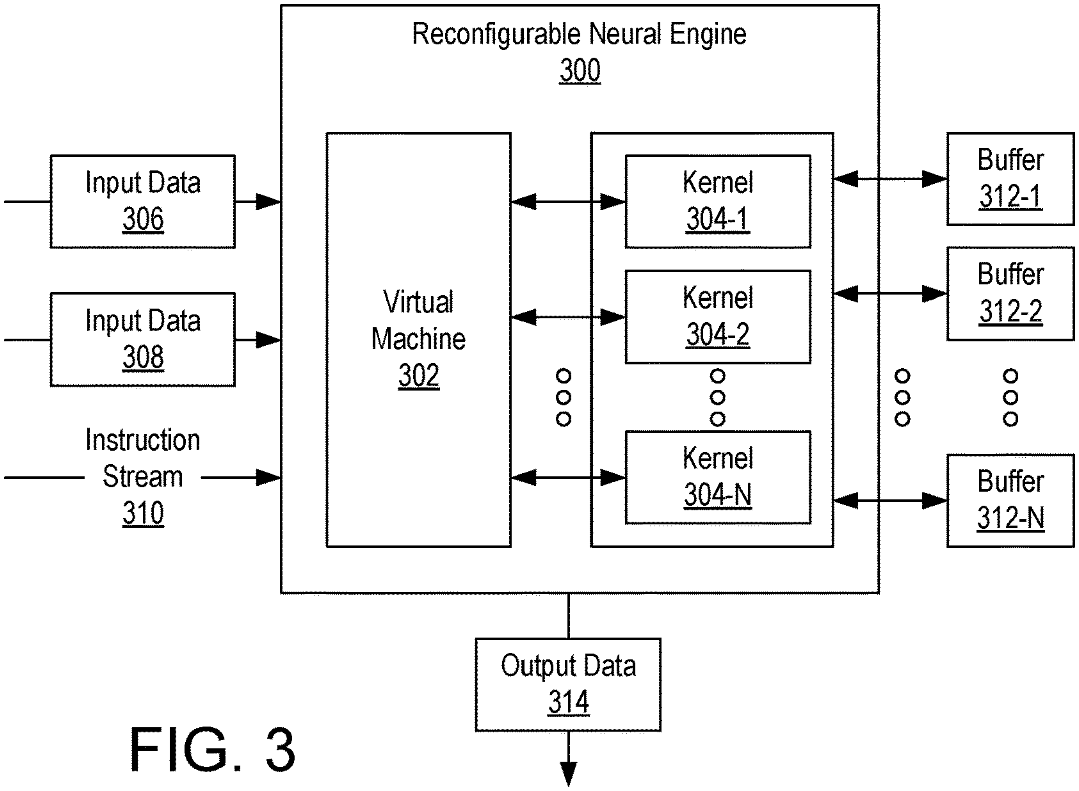
FIG. 3 illustrates an example of a reconfigurable neural engine.

FIG. 3 illustrates an example of a reconfigurable neural engine 300. Reconfigurable neural engine 300 refers to a particular implementation or instance of a virtual machine 302 coupled to one or more kernels 304 (e.g., 304-1, 304-2 through 304-N). Virtual machine 302 is capable of receiving input data 306, input data 308, and one or more instructions via instruction stream 310. In an example implementation, each of input data 306, 308 may represent a window of data of a particular size. For purposes of illustration and not limitation, input data 306 and input data 308 each may be a 2×8 kB window of data with the windows being double buffered.

Reconfigurable neural engine 300 is capable of performing memory management for kernels 304 by regulating access of different ones of kernels 304 to different ones of buffers 312 (e.g., 312-1, 312-2, through 312-N). Buffers 312 may be local memory buffers for kernels 304. Kernel 304 may operate on input data 306 and/or 308 as stored in buffers 312 and generate results that are output as output data 314. Output data 314 may be an output window or data stream.

In the example of FIG. 3, kernels 304 may implement any of a variety of different ML functions. For example, kernel 304-1 may be a General Matrix Multiply (GEMM) kernel. Kernel 304-2 may be a BiasADD kernel. Another kernel 304 may be a Rectified Linear Unit (ReLU) kernel. Yet another kernel 304 may be a Requantize kernel (e.g., a kernel capable of performing shift and scale functions). Still other kernels 304 may implement other ML functions such as Gaussian Error Linear Units (GELU), layer normalization, Softmax, or the like. The example ML functions provided herein are intended to be a non-exhaustive list of functions and/or ML functions that may be implemented by kernels 304.

Virtual machine 302 is capable of receiving kernel instructions (e.g., as instruction stream 310) from another circuit and/or system such as microcontroller 110. Virtual machine 302 is capable of interpreting the received kernel instructions. In response to the kernel instructions and interpretation thereof, virtual machine 302 is capable of controlling operation of kernels 304. The interpretation of kernel instructions by virtual machine 302 makes kernels 304 programmable. More particularly, responsive to the received kernel instructions, virtual machine 302 is capable of selecting one or more of kernels 304, configuring particular aspects of the selected kernel(s) 304, managing local memory buffers of the selected kernel(s) 304, running the selected kernel(s) 304, and potentially returning data generated by selected kernel(s) 304. The data may be returned as output data 314.

In one or more examples, virtual machine 302 is implemented as a state-machine that is configured to receive and operate on instruction stream 310 as generated and/or provided by another circuit and/or system. Virtual machine 302 is capable of parsing incoming kernel instructions to determine the size of the kernel instruction packet, determine which kernel will be run based on an opcode parsed from the kernel instruction, determine memory availability and reuse, and assign buffers 312 to the kernel to be run as specified by the opcode of the kernel instruction. In this regard, reconfigurable neural engine 300 is compatible with any higher-level framework (e.g., circuit and/or system) that can support the instruction format used by reconfigurable neural engine 300 and, more particularly, virtual machine 302.

In one aspect, reconfigurable neural engine 300 may be implemented in a compute tile 202 of data processing array 112. For example, reconfigurable neural engine 300 may be deployed to a core 208 of a compute tile 202 of data processing array 112. As another more particular example, virtual machine 302 may be stored in program memory 210 and executed by a scalar processor of core 208 to control a vector processor that executes the kernels. In another aspect, a plurality of instances of reconfigurable neural engine 300 may be deployed to multiple cores 208 of multiple compute tiles 202 of data processing array 112. In any case, microcontroller 110 is capable of providing kernel instructions to the reconfigurable neural engine 300 instances implemented in compute tiles 202 of data processing array 112.

Figure 4:
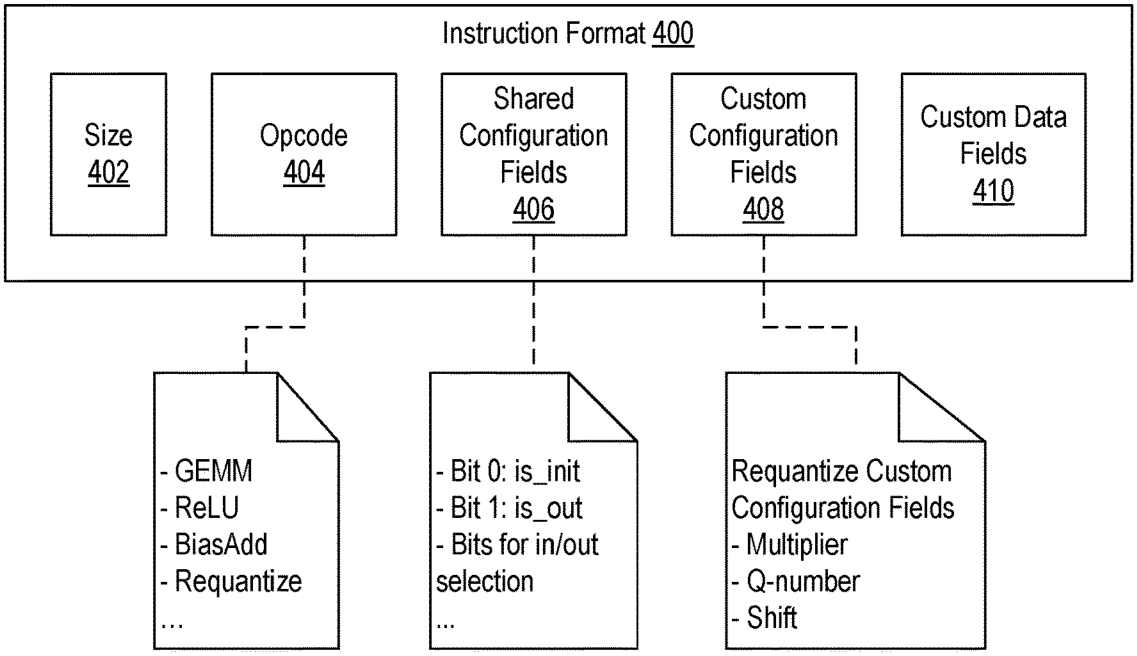
FIG. 4 illustrates an example of an instruction format that may be used by a virtual machine of a reconfigurable neural engine.

FIG. 4 illustrates an example of an instruction format 400 that may be used by virtual machine 302. That is, kernel instructions may be specified in conformance with the example instruction format 400. Instruction format 400 includes a size field 402, an opcode field 404, one or more shared configuration fields 406, one or more custom configuration fields 408, and one or more custom data fields 410.

Size field 402 specifies the size in bytes of the kernel instruction. Opcode 404 may specify the particular kernel to be executed for a given reconfigurable neural engine implementation. For purposes of illustration and not limitation, opcode field 404 may specify a particular kernel 304 to be executed such as GEMM, ReLu, BiasAdd, Requantize, or the like. Shared configuration field(s) 406 may specify bits of configuration data. Examples of such configuration data bits may include is_init bit, an is_out bit, and/or bits specifying particular input and/or output buffer(s). Custom configuration fields 408 may specify additional configuration fields on a per opcode basis. For example, for an opcode specifying the Requantize kernel, custom configuration field(s) 408 may specify configuration data for the kernel such as a multiplier, a Q-number, and/or an amount by which to shift data.

In the example of FIG. 4, a kernel may run multiple times before outputting data. If a kernel runs four times, for example, four kernel instructions for the kernel (e.g., specifying the opcode of the kernel) will be received by virtual machine 302. The shared configuration fields 406 may contain different data for the different iterations or runs of the kernel. The is_init bit may be used in a kernel instruction to indicate whether a specified buffer should be zeroed (e.g., initialized). The is_out bit may be used in a kernel instruction to indicate whether the kernel is outputting data or storing data in a different buffer for reuse in a next iteration or run. Other bits may be used to indicate whether the kernel is to shift data and by how much for a given run. For example, instruction format 400 may be used to manage local memory for kernels 304. Instruction format 400 may specify one or more bits that define an input buffer to be used for a given instruction and/or an output buffer to be used for a given instruction.

Kernel instructions conforming to instruction format 400 can specify configuration data that can be used by virtual machine 302 to configure the respective kernels 304. That is, virtual machine 302 may receive a kernel instruction. From the kernel instruction, virtual machine 302 is capable of determining the particular kernel(s) 304 to which the instruction pertains, configuring the kernel(s) in accordance with predetermined rules within virtual machine 302 and/or configuration data specified by the kernel instruction, and invoking or running the kernel(s) 304. The configuration data, whether hard coded within virtual machine 302 or obtained from the received kernel instruction may be provided to the kernel(s) 304 specified by the instruction to cause the kernel(s) 304 to operate in a particular mode of operation that may be one of a plurality of different modes of operation for the selected kernel(s) 304.

As an example, consider the case where kernel 304-1 implements a linear approximation kernel. That is, kernel 304-1 may implement any one of a plurality of different functions (e.g., activation functions) through linear approximation. In that case, virtual machine 302 determines configuration data specified by a received kernel instruction specifying the linear approximation kernel, provides the configuration data to the kernel, and invokes the kernel as configured. In this example, the configuration data may specify different coefficients to be used by the kernel in performing an operation. The particular coefficients may be specific to the mode of operation and the linear approximation performed. Thus, the particular mode of operation of the kernel may be invoked by way of passing different kernel instructions targeted to the same kernel, albeit with different configuration data to virtual machine 302.

Figure 5:
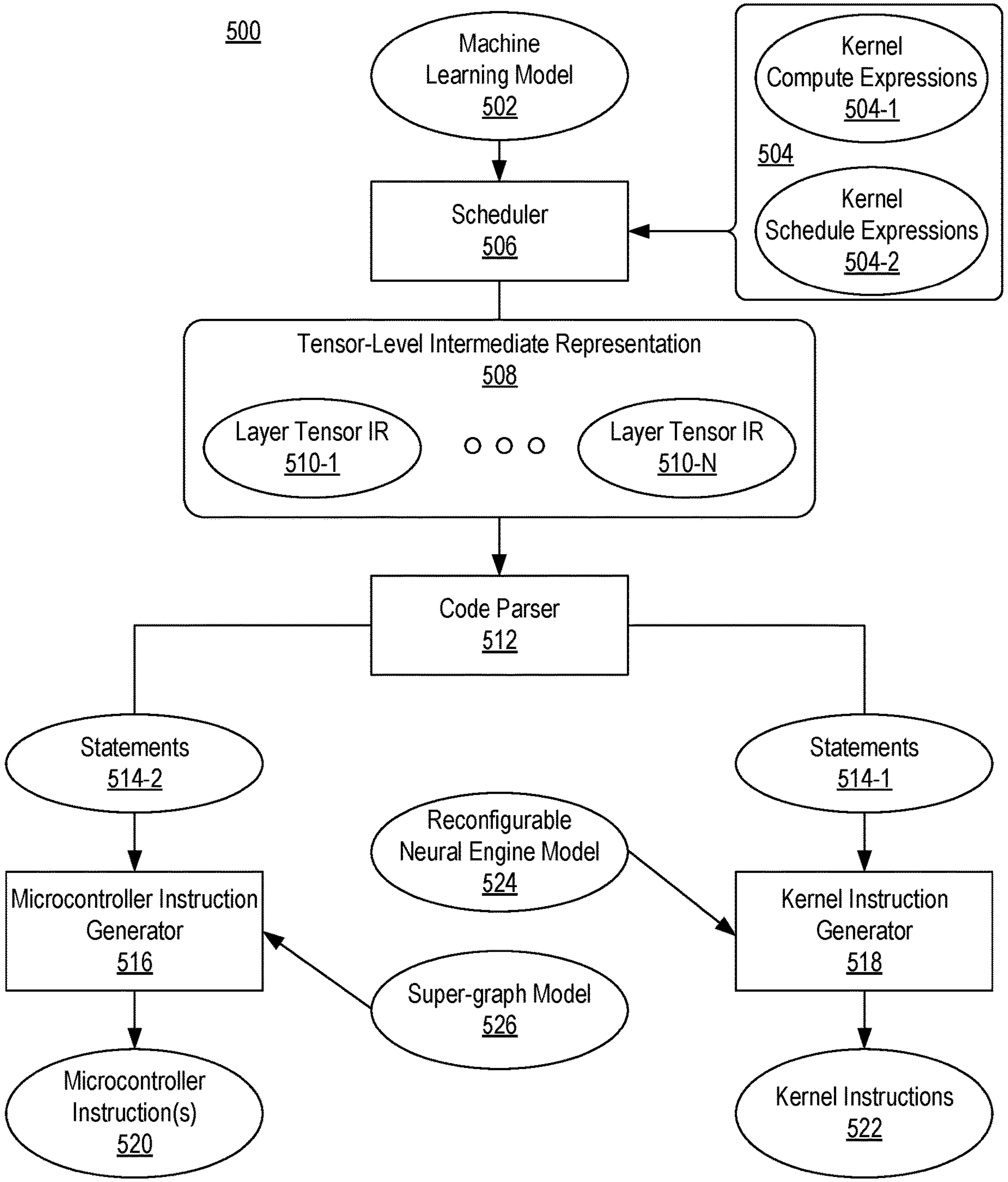
FIG. 5 illustrates certain operative features of a compiler in accordance with the inventive arrangements described herein.

FIG. 5 illustrates certain operative features of an example compiler 500. Compiler 500 may be implemented as program code executed by a data processing system, e.g., a computer, to perform the operations described herein. An example of a data processing system that may be used to execute compiler 500 is host system 102 of FIG. 1 and/or the data processing described in connection with FIG. 10. Compiler 500 is capable of generating instructions that are executable by microcontroller 110 and data processing array 112 at runtime to implement an ML model to perform inference on received data.

In the example, compiler 500 includes a scheduler 506, a code parser 512, a microcontroller instruction generator 516, and a kernel instruction generator 518. Scheduler 506 receives ML model 502 and kernel expressions 504 as input. Scheduler 506 is capable of generating a tensor-level intermediate representation (IR) 508 from ML model 502 using kernel expressions 504. In the example of FIG. 5, tensor-level IR 508 includes a layer tensor IR 510 corresponding to each layer of the multilayered model specified by ML model 502. Each layer tensor IR 510 specifies an implementation of the layer of ML model 502 that is specific to the target hardware. In this example, the target hardware is an accelerator system including microcontroller 110 and data processing array 112.

For example, ML model 502 specifies a particular artificial neural network (hereafter "neural network") having a plurality of layers. ML model 502 may specify the neural network as a graph. For purposes of illustration and not limitation, ML model 502 may be specified using any of a variety of available machine learning frameworks. Examples of machine learning frameworks include, but are not limited to, PyTorch and TensorFlow.

Kernel expressions 504 include kernel compute expressions 504-1 and kernel schedule expressions 504-2. In general, kernel compute expressions 504-1 are descriptions of the operation functionality and data format(s) consumed by the operations. A kernel compute expression 504-1, for example, specifies what the particular functions are and how such functions are executed on designated target hardware. Each kernel compute expression, for example, may correspond to, or represent, a particular ML function such as convolution, matrix multiply, or the like, as ultimately provided by a kernel 304. Kernel compute expressions 504 may be specified in a high-level programming language such as Python or C/C++. As an illustrative and non-limiting example, ML model 502 may specify that one layer is to perform convolution. Within ML model 502, the layer is defined in a hardware agnostic manner. A kernel compute expression 504-1 for a "convolution function" describes how the convolution function is to be implemented on the target hardware by defining the particular operations that are performed to implement the convolution function. Each kernel compute expression also defines where kernel intrinsics are to be inserted within the respective layer tensor IRs 510.

Kernel schedule expressions 504-2, in general, specify other aspects of the kernel such as parallelization, pipelining, caching, loop reordering, and etc. For example, the kernel schedule expression 504-2 may provide details for a kernel compute expression 504-2 (e.g., for a convolution kernel) such as how many compute tiles 202 are to be used to perform convolution, parallelization to be used (if any) in the target hardware, pipelining to be used (if any) in the target hardware, and the like. A kernel schedule expression 504-2 for a "convolution function" describes how data is to be moved for the convolution function and defines where data movement intrinsics are to be inserted within the respective layer tensor IRs 510. Kernel expressions 504 may be referred to herein as a high-level schedule.

Listing 1 is an example of a kernel compute expression. The source code of Listing 1 specifies an example kernel compute expression specifying matrix multiplication on 8-dimensional input tensors.

Listing 1

```
Dense = te.compute(
  (
    M / (pm * qm * tm * m0),
    N / (pn *qn * tn * n0),
    pm * qm,
    pn * an,
    tdn,
    tn / tdn,
    tm / tdm,
    tdm,
    m0
    n0,
  ),
  lambda mo, no, qm_i, qn_i, tdn_i, tn_i, tm_i, tdm_i, m0_i, n0_i:
    te.sum(
      FormattedInput[mo, ro, qm_i, tm_i, rm, tdm_i, m0_i, ri]
      * FormattedWeight[ro, no, qn_i, tn_i, tdn_i, rm, ri, n0_i],
      axis=[ro, rm, ri],
    ),
    name="dense",
  )
)
```

Listing 2 is another example of a kernel compute expression. The source code of Listing 2 specifies an example of a kernel compute expression specifying data formatting for the matrix multiply operation of Listing 1. In the example of Listing 2, the data formatting is described with a tensor transpose expression.

Listing 2

```
FormattedInput = te.compute(
  (M / (pm * tm * m0), K / (tk * k0), pm * qm, tm / tdm, tk, tdm, m0, k0),
  lambda mo, ko, q_i, tm_i, tk_i, tdm_i, m0_i, k0_i: Input[
    mo * pm * qm * tm * m0 + q_i * tm * m0 + tm_i * tdm * m0 + tdm_i * m0 +
    m0_i,
    k0 * tk * k0 + tk_i * k0 + k0_i,
  ]
)
```

Different ones of the kernel expressions 504 may specify how a corresponding kernel 304 available as part of a reconfigurable neural engine 300 operates. Each of kernels 304 may be an implementation of a set of computational operations referred to as a "kernel intrinsic." The kernel intrinsics are executable on compute tiles 202 by kernels 304. The kernel intrinsics are not equivalent to hardware-level intrinsics of the compute tiles 202. Rather, the kernel intrinsics represent higher level operations or functions available from the various kernels 304. Each kernel intrinsic, for example, is formed of one or more hardware-level intrinsics of the compute tile 202.

An intrinsic refers to a built-in function or subroutine available for use in a given programming language whose implementation is handled specially by the compiler. The compiler, for example, may substitute a sequence of automatically generated instructions for the original function call, similar to an inline function. Unlike an inline function, the compiler has an intimate knowledge of an intrinsic function and can thus better integrate and optimize the intrinsic for a given situation.

Figure 6:
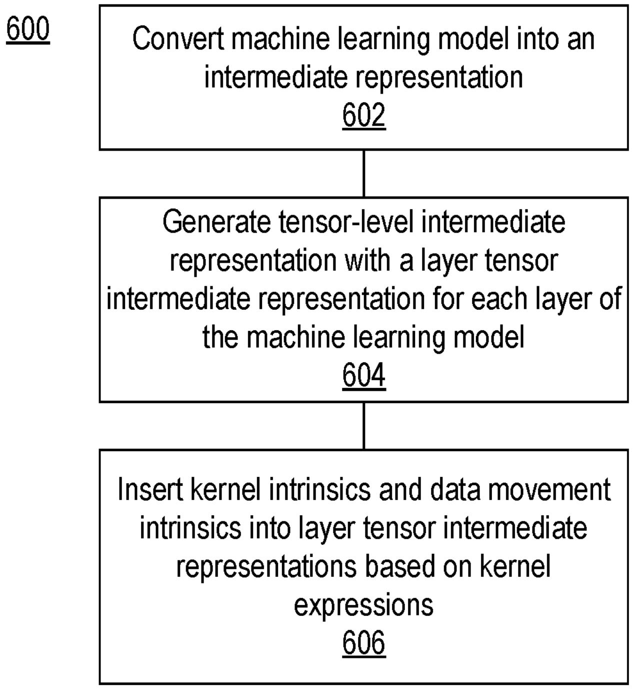
FIG. 6 is an example method illustrating certain operational features of the scheduler of FIG. 5.

FIG. 6 is an example method 600 illustrating certain operational features of scheduler 506 of FIG. 5. Referring to FIGS. 5 and 6, in block 602, scheduler 506 converts ML model 502 into an IR. The IR may be a tensor level IR. For example, block 602 may convert ML model 502 into an IR that expresses ML model 502 in terms of tensors and tensor expressions. The IR generated may be agnostic with respect to target hardware. In block 604, scheduler 506 generates tensor-level IR 508. Tensor-level IR 508 includes a layer tensor IR 510 for each layer of ML model 502. As noted, each layer tensor IR 510 is a description of the data movements and computations for a particular layer of ML model 502 that is specific to the target hardware.

In block 606, scheduler 506 inserts, into the respective layer tensor IRs 510, calls to kernel intrinsics and calls to data movement intrinsics based on kernel expressions 504 (e.g., kernel compute expressions 504-1 and kernel schedule expressions 504-2). As noted, kernel compute expressions 504-1 define how the different functions of ML model 502 are to be implemented with respect to the target hardware in terms of kernel intrinsics. Kernel compute expressions 504 also specify data formatting. Kernel schedule expressions 504-2 define data movement intrinsics (e.g., the number of compute tiles to be used, parallelization, pipelining, etc.). As such, kernel expressions 504 specify where within the respective layer tensor IRs 510 calls to compute intrinsics and calls to data movement intrinsics are to be inserted. Scheduler 506 is capable of mapping the descriptions of layer tensor IRs 510 to the available intrinsics supported by the reconfigurable neural engine 300 and inserting calls to the intrinsics within the respective layer tensor IRs 510. In general, a kernel instrinsic, at compile time, represents a runtime invocation of a kernel 304 (e.g., or function of a kernel 304). A data movement intrinsic, at compile time, represents an instruction for microcontroller 110 at runtime.

In another aspect, as part of block 606 in generating tensor-level IR 508, scheduler 506 is capable of generating nested loop constructs containing copy operations that move data from one memory to another based on the kernel compute expressions (e.g., Listing 2). The nested loop constructs define how (e.g., timing and amount) data moves into and/or out from compute tiles 202 at runtime.

Referring again to FIG. 5, for each layer tensor IR 510, code parser 512 is capable of partitioning statements of the layer tensor IR 510 into a first set of statements 514-1 and a second set of statements 514-2. The first set of statements 514-1 are provided to kernel instruction generator 518. In one example, code parser 512 is capable of performing the partitioning by allocating or assigning compute intrinsics to statements 514-1 to be provided to the kernel instruction generator 518. The second set of statements 514-2 are provided to microcontroller instruction generator 516. For example, code parser 512 performs the partitioning by allocating or assigning statements other than kernel intrinsics such as data movement intrinsics and for-loop structures that include copies of data from one memory to another to statements 514-2.

For example, parser 512 is capable of detecting compute intrinsic calls in the statements of tensor-level IR 508 and including the compute intrinsic calls in statements 514-1. Parser 512 is also capable of detecting loop constructs in tensor-level IR 508 and including the loop constructs in statements 514-2. For example, parser 512 is capable of detecting, in the tensor-level IR 508, loop constructs that include one or more copy operations that copy data from one memory to another memory (e.g., data transfers between device memory 106 and/or memory 116 and/or memories within data processing array 112). Parser 512 includes such loop constructs within statements 514-2.

Kernel instruction generator 518 is capable of generating, from the first set of statements 514-1, kernel instructions 522 based on a reconfigurable neural engine model 524. The resulting kernel instructions 522 are executable by virtual machine 302 executing in a compute tile 202 of data processing array 112 to implement compute functions of ML model 502.

Figure 7:
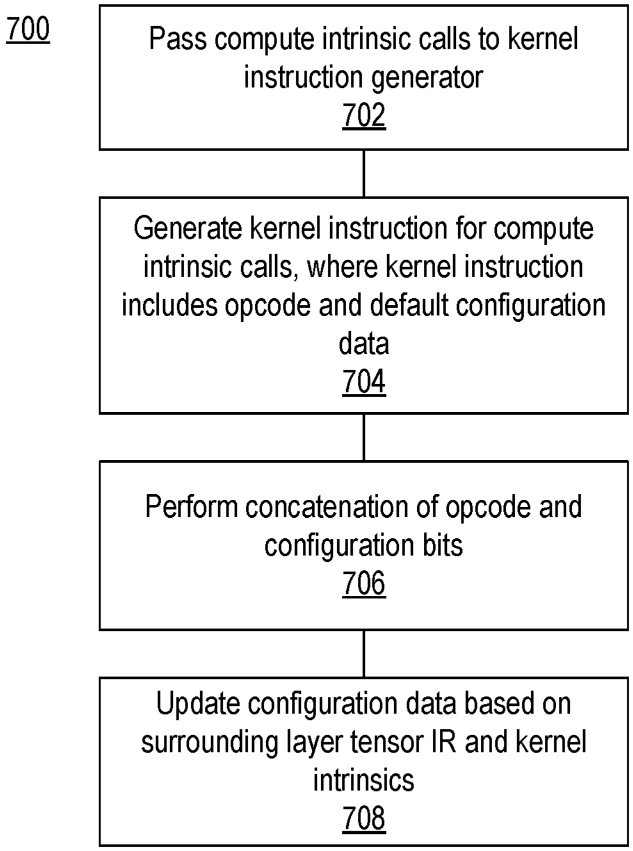
FIG. 7 illustrates an example method of certain operative features of the kernel instruction generator of FIG. 5.

FIG. 7 illustrates an example method 700 of certain operative features of kernel instruction generator 518. In block 702, code parser 512 passes the compute intrinsic calls (e.g., statements 514-1) to kernel instruction generator 518.

In block 704, kernel code generator 518 generates kernel instructions from the intrinsic calls. Each of the kernel instructions that is generated includes an opcode and default configuration data. The default configuration data is updated at a later time. In this regard, the kernel instructions may not be the final kernel instructions 522 that are ultimately executed by virtual machines 302 executing in compute tiles 202. Still, the kernel instructions may conform to a predetermined instruction format that is interpretable or executable by virtual machine 302. The kernel instructions may be specified as bit-level instructions. In an example implementation, the instruction format used to generate kernel instructions is the instruction format 400 of FIG. 4.

For example, each of the bit-level instructions generated by kernel instruction generator 518 includes at least one byte for the opcode (e.g., kernel intrinsic identifier or kernel selector) and two bytes (extensible up to three) for shared configuration fields 406 that virtual machine 302 and the kernels 304 are to support based on the predetermined instruction format. For purposes of illustration, shared configuration fields 406 may include bits for specifying whether local memory buffers should be initialized. As noted, initially the configuration data is specified as default configuration data. The bit, e.g., the is_init bit, may specify that, for a given execution of a kernel, an accumulator buffer used by the kernel specified by the opcode needs to be reset to zero to start a new calculation. Another bit, e.g., the is_out bit, may specify whether the kernel specified by the opcode should return a result through the output port of reconfigurable neural engine 300. Additional shared configuration bits may be used to specify input local buffer(s) for the kernel specified by the opcode, output local buffer(s) for the kernel specified by the opcode. The shared configuration bits may be used in cases where a sequence of kernel instructions are generated that specify different local data buffers as input(s) and output(s) for the kernels being invoked depending on the order in which the kernel instructions execute.

The kernel instruction may include bits specifying custom kernel intrinsic configuration(s) (e.g., corresponding to custom configuration fields 408) and custom data (e.g., corresponding to custom data fields 410). Custom configuration data to be included in custom configuration fields 408 are similar to shared configuration fields 406, but are kernel-specific. Custom data to be included in custom data fields 410 may specify parameter values such as quantization scaling information or dynamic parameter tables like the polynomial coefficients for non-linear activation functions previously described. In one aspect, the total size specified in the size field 402 may be variable and a multiple of 4 bytes.

In generating the bit-level kernel instructions, kernel instruction generator 518 uses a reconfigurable neural engine model 524. Reconfigurable neural engine model 524 contains information on which kernel intrinsics are available and how the kernel intrinsics can be constructed. Listing 3 shows an example of a portion of reconfigurable neural engine model 524 specifying an instruction format for a Requantize kernel. Listing 3 may be used by kernel instruction generator 518 in generating the bit-level kernel instruction for such a kernel. The example of Listing 3 specifies the particular bits to be set to enable certain functionality of the Requantize kernel. For example, Listing 3 indicates the bits to be set to enable functionality such as initialization, returning data, selecting input and output buffers, and performing sub-operations like q_multiply_shift. The operations also can include data fields for data parameters used by the kernel such as the int32 multiplier, the int8 Q number, and the int8 shift value.

Listing 3

```
"requantize": {
  "OPCODE": 4,
  "FUSED_OPS": {
    "init": { "CONF_CODE": 1 },
    "out": { "CONF_CODE": 2 },
    "in_sel_a": { "CONF_CODE": 4 },
```

-continued

Listing 3

```
    "in_sel_b": { "CONF_CODE": 8 },
    "in_sel_acc": { "CONF_CODE": 16 },
    "in_sel_c": {"CONF_CODE": 32 },
    "out_sel_a": { "CONF_CODE": 64 },
    "out_sel_b": { "CONF_CODE": 128 },
    "out_sel_acc": { "CONF_CODE": 256 },
    "out_sel_c": { "CONF_CODE": 512 },
    "q_multiply_shift": {
      "CONF_CODE": 1024,
      "DATA": [
        ["multiplier", 0, "int32"],
        ["q", 4, "int8"],
        ["shift", 5, "int8"]
      ]
    }
  }
}
```

The example of Listing 3 is specified in JSON and represents an intrinsic available in reconfigurable neural engine 300. It should be appreciated that other descriptive languages may be used in lieu of JSON. The configuration codes (CONF_CODE) refer to shared and custom bits that must be set inside the relevant fields of a kernel instruction to enable functionality. The data keyword refers to data parameters that must be included in the instruction for the kernel intrinsic.

In block 706, kernel instruction generator 518 concatenates the opcode and the configuration fields. In one aspect, kernel instruction generator 518 performs a soft concatenation. A soft concatenation means that kernel instruction generator 518 represents the bit-level kernel instructions in tensor IR format and does not actually perform concatenation at the bit level. Using soft concatenation allows kernel instruction generator 518 and/or microcontroller instruction generator 516 to perform optimizations on the kernel instructions more easily than if hard concatenation were performed resulting in a binary instruction.

Examples of compiler-level representations of instructions and sequences of instructions are illustrated below. The soft-concatenate functionality maintains a data structure in the tensor IR format and is more readable. Keeping the kernel instructions in such a format allows runtime optimization techniques to be applied to the kernel instructions. Examples of runtime optimization techniques that may be applied to kernel instructions include, but are not limited to, changing parameter data "on-the-fly" (e.g., during runtime of the ML model on the data processing array 112) for better ML model accuracy. Parameters that may be changed "on-the-fly" may include quantization scaling parameters and non-linear function approximation coefficients.

Listing 4 illustrates an example tensor IR representation of an instruction generated in block 704 and concatenated using soft concatenation. In the example of Listing 4, the instruction is a 4-byte instruction configuration with a variable sized buffer load.

Listing 4

```
@vaie.concat(
   @vaie.instr_config("01000000")
   @tir.address_of((int8*)data_buf[0], dtype=handle)
)
```

Listing 5 illustrates an example of a compiler level representation of a sequence of instructions concatenated using soft concatenation.

Listing 5

```
@vaie.concat(
   @vaie.concat(
      @vaie.instr_config("01000000"),
      @tir.address_of((int8*)data_buf0[0], dtype=handle)
   ),
   @vaie.concat(
      @vaie.instr_config("02000000"),
      @tir.address_of((int8*)data_buf1[0], dtype=handle)
   )
)
```

For purposes of illustration and comparison, Listing 6 illustrates an example of a compiler-level representation of a sequence of kernel instructions in which hard concatenation is used.

Listing 6

```
@vaei.instr("010000000416400000001ffb00020000
   00000000000000000000")
```

As may be observed, Listings 5 and 6 preserve the data structure of the individual kernel instructions and various fields therein. Listings 5 and 6 also provide a human readable format for the kernel instructions. Listing 6 does not preserve the structure of the individual fields of the kernel instruction and is not in human readable form.

In block 708, kernel instruction generator 518 updates the configuration bits for the kernel instructions based on surrounding tensor IR code and the kernel intrinsics. For example, kernel instruction generator 518 sets the bits of the various fields (e.g., 406, 408, and/or 410) for the kernel instructions. In setting the configuration bits, the kernel instructions may be preserved in the tensor IR format illustrated in the examples of Listings 4 and 5. With the configuration bits of the kernel instructions set, kernel instruction generator 518 outputs kernel instructions 522.

For example, having generated basic kernel instructions including the default configuration data, kernel instruction generator 518 is capable of analyzing tensor-level IR 508 to embed global data dependency configuration information into the kernel instructions. Kernel instruction generator 518 for example sets the is_init and is_out bits of the various kernel instructions. Setting the is_init and is_out bits may be performed through "async wait" annotations included in tensor-level IR 508, which indicate that the internal compute intrinsics (e.g., kernels 304) will be executed in an asynchronous fashion. In other words, the intrinsic calls execute without blocking and waiting for data until the last instrinsic call. An example of this is illustrated in Listing 7 and in Listing 8.

For example, for a given kernel that is invoked multiple times, the initial kernel instruction for the kernel will have the is_init bit set to one indicating that initialization of memory is required. The last kernel instruction for the kernel will have the is_out bit set to one indicating that the kernel should generate an output. Each other kernel instruction to the kernel between the initial kernel instruction and the last kernel instruction will have the is_init bit and the is_out bit set to zero. The resulting kernel instructions 522 include correct configuration data and may be specified in the tensor IR format. Kernel instructions 522 are referenced inside tensor-level IR 508 and by microcontroller instructions 520 that will be generated by microcontroller instruction generator 516.

Listing 7 illustrates the default configuration state of the instruction configuration fields.

Listing 7

```
attr "pragma_aie_wait" = 1 {
for (i, 0, 2) {
   @vaie.instr(
      @vaie.concat(
         @vaie.instr_config("01000000"),
         @tir.address_of((int8*)data_buf[0], dtype=handle)
      ),
      @tir.address_of((int8*)res.local[1024*i], dtype=handle),
      @tir.address_of((int8*)A.local[1024*i], dtype=handle),
      @tir.address_of((int8*)B.local[1024*i], dtype=handle)
   )
}
}
```

Listing 8 illustrates the configuration fields of the kernel instructions once updated with correct initialization and output information. As shown, the first kernel instruction has the is_init bit set (e.g., where the value for @vaie.instr_config is "01010000"), while the second kernel instruction has the is_out bit set (e.g., wherein the value for @vaie.instr_config is "01020000"). Further, the buffer addresses in the instructions are updated to 0 for the first kernel instruction and 1024 for the second kernel instruction.

Listing 8

```
@vaie.instr(
   @vaie.concat(
      @vaie.instr_config("01010000"),
      @tir.address_of((int8*)data_buf[0], dtype=handle)
   ),
   @tir.address_of((int8*)res.local[0], dtype=handle),
   @tir.address_of((int8*)A.local[0], dtype=handle),
   @tir.address_of((int8*)B.local[0], dtype=handle)
)
@vaie.instr(
   @vaie.concat(
      @vaie.instr_config("01020000"),
      @tir.address_of((int8*)data_buf[0], dtype=handle)
   ),
   @tir.address_of((int8*)res.local[1024], dtype=handle),
   @tir.address_of((int8*)A.local[1024], dtype=handle),
   @tir.address_of((int8*)B.local[1024], dtype=handle)
)
```

Referring again to FIG. 5, microcontroller instruction generator 516 is capable of generating, from the second set of statements 514-2, microcontroller instructions 520 based on a super-graph model 526. Microcontroller instructions 520 are executable by microcontroller 110 of data processing array 112 to move data into and out from data processing array 112. In one or more example implementations, microcontroller 110 may execute a virtual machine that is capable of executing microcontroller instructions 520.

Table 1 illustrates example microcontroller instructions 520 that are executable by the virtual machine executed by microcontroller 110. The simplicity of the example microcontroller instructions of Table 1 allows compiler 500 to dictate much of the functionality. This simplicity provides compiler 500 with flexibility to generate microcontroller instructions 520 that are suitable for a variety of different accelerator designs intended to execute on data processing array 112.

TABLE 1

| Microcontroller Instruction Name | Fields | Description |
|---|---|---|
| EnqueueBD | port_id, bd_id, dma_buffer_descriptor | Enqueue a buffer descriptor on a selected port of the data processing array. |
| Wait | port_id | Wait for data to be returned on the specified port. |
| Concat | reg_id_a, size_a, reg_id_b, size_b | Concatenate the buffers pointed to by the two virtual registers. May be used for "at runtime" creation of kernel instructions. |
| Move | reg_id, byte_array | Move a byte array to a virtual register (create a temporary buffer and point to the temporary buffer with reg_id). |
| Load | reg_id, scope, offset, lanes, dtype, heap_id | Load a buffer referred to with a virtual heap id onto a virtual register. |

Figure 8:
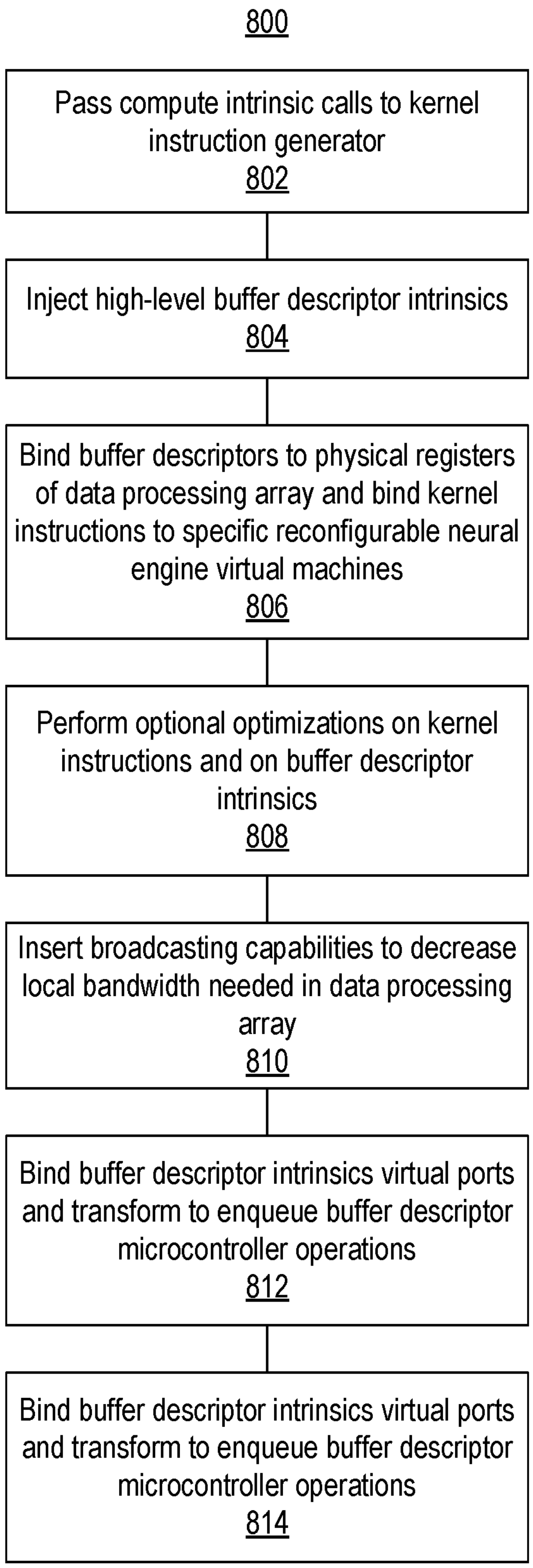
FIG. 8 illustrates an example method illustrating certain operative features of the microcontroller instruction generator of FIG. 5.

FIG. 8 illustrates an example method 800 illustrating certain operative features of microcontroller instruction generator 516. In block 802, code parser 512 passes statements 514-2 to microcontroller instruction generator 516. As noted, the statements included in statements 514-2 may include data movement intrinsics and/or for-loop structures. In block 804, microcontroller instruction generator 516 injects high-level buffer descriptor intrinsics into the received statements. For example, microcontroller instruction generator 516 is capable of analyzing annotated "for-loop" structures in the received statements 514-2 and injecting buffer_descriptor_load and buffer_descriptor_store intrinsic calls.

Listing 9 illustrates an example of annotated nested "for-loops." Listing 10 illustrates an example of a buffer_descriptor_load instrinsic call generated by microcontroller instruction generator 516 from the nested "for-loops" of Listing 9.

Listing 9

```
attr "pragma_aie.buffer_descriptor" = 1;
for (ax3.ax4.fused_1, 0, 8) {
  for (ax5_1: int32, 0, 16) {
    for (ax6_1: int32, 0, 4) {
      for (ax7_1: int32, 0, 8) {
        compute.d.local[
          ((((ax3.ax4.fused_1*512) + (ax5_1*32)) + (ax6_1*8))
        + ax7_1)] − (int8x8*)placeholder.shared[
          ((((ax3.ax4.fused_1*1024) + (ax6_1*128)) +
        (ax5_1*8)) + ax7_1) + 512
        ]
      }
    }
  }
}
```

Listing 10

```
@vaie.buffer_descriptor_load(
  @tir_address_of((int8*)compute.d.local[0], dtype=handle), −1, −1, −1,
  @tir_address_of((int8*)placeholder.shared[512], dtype=handle), −1, −1, −1,
  4096, 1, 128, 8, 1024, 8, 4, 16, 8, dtype=int8
)
```

In some cases, since buffer descriptors are limited in the addressing that may be described, not all variations of nested for-loops may be converted into buffer descriptor intrinsic calls. The generated buffer descriptor intrinsics are considered "high-level" since the buffer descriptor intrinsics only specify information about the buffer descriptor to be used while copying or moving data from one abstract buffer to another and specify the place in the target hardware memory hierarchy (e.g., global, shared, or local). Subsequently, the buffer descriptor intrinsics are mapped to physical buffer descriptor registers on data processing array 112. Prior to the mapping, microcontroller instruction generator 516 may perform one or more optimizations on the buffer descriptor intrinsics such as, for example, collapsing reversed buffer descriptor intrinsics and potentially fusing subsequent load and store, or, store and load intrinsics.

In block 806, microcontroller instruction generator 516 uses super-graph model 526 to bind buffer descriptors to physical registers of data processing array 112 and bind kernel instructions 522 to specific virtual machines 302 (e.g., as mapped to compute tiles 202 of data processing array 112).

Figure 9:
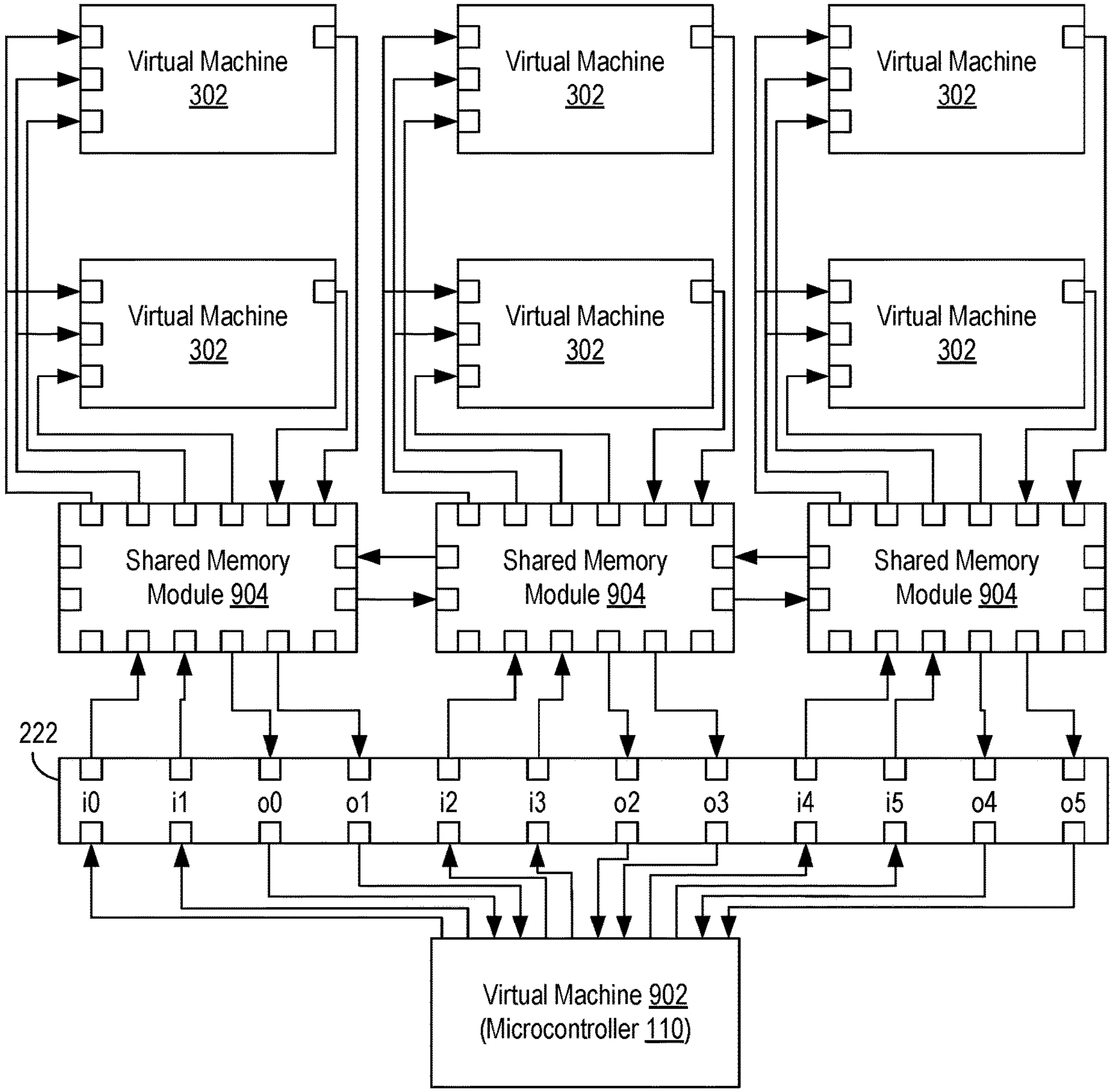
FIG. 9 illustrates an example of a super-graph model.

FIG. 9 illustrates an example of super-graph model 526. In general, super-graph model 526 is a model that specifies how data flows in data processing array 112. In the example, super-graph model 526 is parameterized by a set of spatial and temporal parameters defining a number of compute tiles 202 in the array columns, a number of rows of compute tiles 202 that will be used, how large the computations performed by each compute tile 202 will be, and port connections. Super-graph model 526, for example, specifies which ports are connected, how to get data to a particular tile, and ports to use. Super-graph model 526 also specifies which channels within a given port should be used. Other data such as buffer descriptors and multiplexer settings may be specified as well.

As illustrated, super-graph model 526 defines an array of virtual machines 302 each being a part of a reconfigurable neural engine 300 (not shown). Each virtual machine 302 has three inputs and one output. Each virtual machine 302 is capable of running kernel intrinsics (e.g., one or more kernels) that are connected to shared memory modules 904 and microcontroller 110 through virtual ports. The ports are virtual as the ports may not physically exist on data processing array 112. One or more (e.g., multiple) virtual ports can be mapped to one physical port in data processing array 112. Microcontroller instruction generator 516 uses super-graph model 526 to configure the buffer descriptors and write data on the virtual ports. Data residing in global DDR memory (e.g., device memory 106) can only be written on the external ports i0, i1, i2, i3, i4, and i5. Local and/or shared data can only be retrieved on the kernel instruction intrinsics (e.g., kernels) to/from specific virtual machines 302.

In general, in super-graph model 526, virtual machine 902 is ultimately mapped to and executed by microcontroller 110. The external port connections i0, i1, i2, i3, i4, and i5 and o0, o1, o2, o3, o4, and o5 may be realized by interface tiles 204 of array interface 222. Shared memory modules 904 may be realized by memory tiles 206. Virtual machines 302 are allocated to and executed by cores 208 of compute tiles 202. Local buffers used by virtual machines 302 may be implemented in data memories 212.

Regarding binding kernel instructions to specific virtual machines 302, microcontroller instruction generator 516 is capable of assigning kernel instructions to particular virtual machines 302 using the (x, y) coordinates of the respective virtual machines 302. Binding of kernel instructions is performed by microcontroller instruction generator 516 using super-graph model 526 based on the high-level schedule (e.g., kernel expressions 504) that the developer has written for an operation.

In block 808, microcontroller instruction generator 516 optionally performs one or more optimizations on kernel instructions and on buffer descriptor intrinsics. Microcontroller instruction generator 516 is capable of performing one or more transformations and optimizations. In one aspect, the optimizations include fusing kernel intrinsics to do as much work as possible inside the respective virtual machines 302 using a single call, which reduces the data bandwidth into and out of data processing array 112, thereby increasing throughput and/or lowering latency. That is, two or more kernel instructions may be fused, e.g., combined, into a single larger kernel instruction.

In block 810, microcontroller instruction generator 516 is capable of optionally inserting broadcasting capabilities to decrease local bandwidth needed in data processing array 112. Inserting broadcasting capabilities is another example of an optional optimization that may reduce bandwidth usage by broadcasting data and instructions through the stream switches between the shared memory modules and input ports of virtual machines 302. Broadcasting is illustrated in FIG. 9 where one virtual port on a shared memory module 904 is connected to multiple virtual machine 302 input ports.

In block 812, microcontroller instruction generator 516 is capable of binding buffer descriptor intrinsics to virtual ports and transforming the buffer descriptor instrinsics to Enqueue buffer descriptor microcontroller operations. For example, in block 812, microcontroller instruction generator 516 maps the buffer descriptor intrinsics to the EnqueueBD microcontroller opcodes of Table 1. Microcontroller instruction generator 516, for example, binds shared buffers such as "placeholder.shared[512]" from Listing 10 to addresses on specific shared memory modules 904 or across such shared memory modules 904. Microcontroller instruction generator 516 can then allocate a buffer descriptor intrinsic or a compute intrinsic accessing the shared buffer to specific virtual ports of super-graph model 526 based on the destination virtual machine 302, shared memory modules 904, or external global buffer (e.g., in device memory 106).

Once the compute intrinsics and shared buffers have been mapped to specific virtual machines 302 and shared memory modules 904, the buffer descriptor intrinsics that are responsible for moving data from global buffers in device memory 106 to shared buffers in shared memory modules 904 or the other way around can be mapped the virtual external ports (e.g., i0, i1, i2, i3, i4, and i5 and o0, o1, o2, o3, o4, and o5) and ports on the external side (e.g., bottom side) of the shared memory modules 904.

In block 814, microcontroller instruction generator 516 outputs the microcontroller instructions 520. Microcontroller instructions 520 may be specified as an optimized sequence of microcontroller instructions for every tensor IR function created for the different layers of ML model 502. Microcontroller instructions 520 are interpretable by virtual machine 902 as executed by microcontroller 110 and executed if a sequence of inputs is provided. The sequence of inputs may include, for example, runtime model intermediate results, parameter data such as weights for ML model 502, and potentially additional parameter data needed to implement specific operation by the various kernels 304 (e.g., a coefficients table for non-linear approximation functions).

Having generated both microcontroller instructions 520 and kernel instructions 522, the resulting instructions may be stored for subsequent runtime use in executing ML model 502 on data processing array 112 under control of microcontroller 110. In another example, the resulting instructions may be provided to data processing array 112 and microcontroller 110 for execution.

Figure 10:
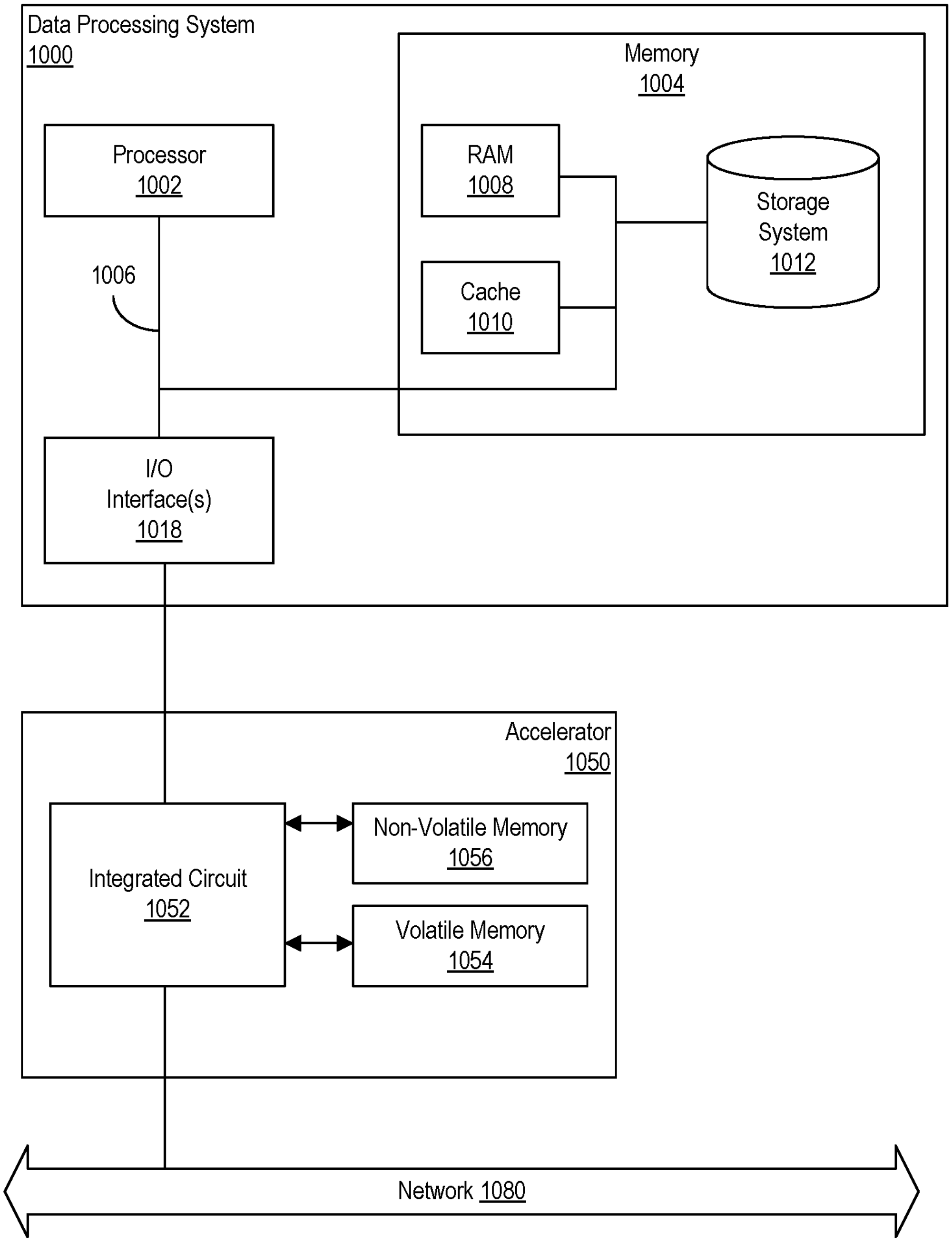
FIG. 10 illustrates an example computing system in which the inventive arrangements may be implemented.

FIG. 10 illustrates an example computing system in which the inventive arrangements may be implemented. As shown, the example computing system includes a data processing system 1000. As defined herein, the term "data processing system" means one or more hardware systems configured to process data, each hardware system including at least one processor and memory, wherein the processor is programmed with computer-readable instructions that, upon execution, initiate operations. Data processing system 1000 can include a processor 1002, a memory 1004, and a bus 1006 that couples various system components including memory 1004 to processor 1002. Data processing system 1000 is an example implementation of host system 102.

Processor 1002 may be implemented as one or more processors. In an example, processor 1002 is implemented as a CPU (e.g., CPU 104). Processor 1002 may be implemented as one or more circuits capable of carrying out instructions contained in program code. The circuit may be an integrated circuit or embedded in an integrated circuit. Processor 1002 may be implemented using a complex instruction set computer architecture (CISC), a reduced instruction set computer architecture (RISC), a vector processing architecture, or other known architectures. Example processors include, but are not limited to, processors having an x86 type of architecture (IA-32, IA-64, etc.), Power Architecture, ARM processors, and the like.

Bus 1006 represents one or more of any of a variety of communication bus structures. By way of example, and not limitation, bus 1006 may be implemented as a PCIe bus. Data processing system 1000 typically includes a variety of computer system readable media. Such media may include computer-readable volatile and non-volatile media and computer-readable removable and non-removable media.

Memory 1004 can include computer-readable media in the form of volatile memory, such as random-access memory (RAM) 1008 and/or cache memory 1010. Data processing system 1000 also can include other removable/non-removable, volatile/non-volatile computer storage media. By way of example, storage system 1012 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1006 by one or more data media interfaces. Memory 1004 is an example of at least one computer program product.

Memory 1004 is capable of storing computer-readable program instructions that are executable by processor 1002. For example, the computer-readable program instructions can include an operating system, one or more application programs (e.g., compiler 500), other program code, and program data. Processor 1002, in executing the computer-readable program instructions, is capable of performing the various operations described herein that are attributable to a computer and, for example, to CPU 104. It should be appreciated that data items used, generated, and/or operated upon by data processing system 1000 are functional data structures that impart functionality when employed by data processing system 1000.

As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

Data processing system 1000 may include one or more Input/Output (I/O) interfaces 1018 communicatively linked to bus 1006. I/O interface(s) 1018 allow data processing system 1000 to communicate with one or more external devices. Examples of I/O interfaces 1018 may include, but are not limited to, network cards, modems, network adapters, hardware controllers, etc. Examples of external devices include devices that allow a user to interact with data processing system 1000 (e.g., a display, a keyboard, and/or a pointing device) and/or other devices such as accelerator 1050. Accelerator 1050 may be configured to communicate over one or more optional networks such as network 1080. In the example, via I/O interface(s) 1018, data processing system 1000 may convey microcontroller instructions 520 and/or kernel instructions 522 as described herein to accelerator 1050 and IC 1052. Network 1080 may be a local area network (LAN) or a wide area network (WAN). For example, network 1080 may be an Ethernet network. In another example, network 1080 may be a public network such as the Internet. In some cases, network 1080 may be omitted.

Data processing system 1000 is only one example implementation. Data processing system 1000 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

In an example implementation, I/O interface 1018 may be implemented as a PCIe adapter. Data processing system 1000 and accelerator 1050 communicate over a communication, e.g., a PCIe communication channel. Accelerator 1050 may be implemented as a circuit board that couples to data processing system 1000. Accelerator 1050 may, for example, be inserted into a card slot, e.g., an available bus and/or PCIe slot, of data processing system 1000.

Accelerator 1050 may include an IC 1052. IC 1052 may include microcontroller 110 and data processing array 112. In another arrangement IC 1052 may include data processing array 112 while microcontroller 110 is disposed on accelerator 1050 external to IC 1052. Accelerator 1050 also may include a volatile memory 1054 coupled to IC 1052 and a non-volatile memory 1056 also coupled to IC 1052. Volatile memory 1054 may be implemented as a RAM. Volatile memory 1054 is an example of device memory 106. As noted, device memory 106 may be included within IC 1052 in some cases. Non-volatile memory 1056 may be implemented as flash memory.

IC 1052 may be implemented as any of a variety of different types of ICs. For example, IC 1052 may be implemented as a System-on-Chip (SoC), an adaptive IC, a Field Programmable Gate Array, an Application-Specific IC (ASIC), or the like. An adaptive IC is an IC that may be updated subsequent to deployment of the device into the field. The adaptive IC may be optimized, e.g., configured or reconfigured, for performing particular operations after deployment. The optimization may be performed repeatedly over time to meet different requirements or needs.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer-readable storage medium" means a storage medium that contains or stores program instructions for use by or in connection with an instruction execution system, apparatus, or device. As defined herein, a "computer-readable storage medium" is not a transitory, propagating signal per se. The various forms of memory, as described herein, are examples of computer-readable storage media. A non-exhaustive list of examples of computer-readable storage media include an electronic storage device, a magnetic storage device, an optical storage device, an electromagnetic storage device, a semiconductor storage device, or any suitable combination of the foregoing. A non-exhaustive list of more specific examples of a computer-readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "soft" in reference to a circuit means that the circuit is implemented in programmable logic or programmable circuitry. Thus, a "soft processor" means at least one circuit implemented in programmable circuitry that is capable of carrying out instructions embodied as program instructions.

As defined herein, the term "output" means storing in physical memory elements, e.g., devices, writing to display or other peripheral output device, sending or transmitting to another system, exporting, or the like.

As defined herein, the term "real-time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer-readable storage medium (or media) having computer-readable program instructions thereon for causing a processor to carry out aspects of the inventive arrangements described herein. Within this disclosure, the term "program code" is used interchangeably with the term "program instructions." Computer-readable program instructions described herein may be downloaded to respective computing/processing devices from a computer-readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer-readable program instructions may include state-setting data. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer-readable program instructions by utilizing state information of the computer-readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer-readable program instructions, e.g., program code.

These computer-readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the operations specified in the flowchart and/or block diagram block or blocks.

The computer-readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A method, comprising:

compiling a machine learning model using kernel expressions into a tensor-level intermediate representation;

partitioning statements of the tensor-level intermediate representation into a first set of statements and a second set of statements;

compiling the first set of statements into kernel instructions based on a reconfigurable neural engine model, wherein the kernel instructions are executable by a compute tile of a data processing array to implement compute functions of the machine learning model;

compiling the second set of statements into microcontroller instructions based on a super-graph model; and executing, by a microcontroller, the microcontroller instructions to control operation of the data processing array in performing operations of the machine learning model.

2. The method of claim 1, wherein the compute tile is configured to execute a virtual machine, and wherein the virtual machine is configured to execute the kernel instructions to invoke one or more kernels of the compute tile.

3. The method of claim 1, wherein the microcontroller is configured to execute a virtual machine, and wherein the virtual machine is configured to execute the microcontroller instructions.

4. The method of claim 1, wherein the reconfigurable neural engine model specifies an instruction format for invoking a plurality of kernels executing in the compute tile.

5. The method of claim 1, wherein the super-graph model specifies data movement in the data processing array.

6. The method of claim 1, wherein the partitioning statements of the tensor-level intermediate representation comprises:

detecting compute intrinsic calls in the statements of the tensor-level intermediate representation; and including the compute intrinsic calls in the first set of statements.

7. The method of claim 6, wherein the partitioning statements of the tensor-level intermediate representation comprises:

detecting, in the tensor-level intermediate representation, loop constructs including a copy operation of data from one memory to another memory; and including the loop constructs in the second set of statements.

8. A system, comprising:

one or more processors configured to perform operations including:

compiling a machine learning model using kernel expressions into a tensor-level intermediate representation;

partitioning statements of the tensor-level intermediate representation into a first set of statements and a second set of statements;

compiling the first set of statements into kernel instructions based on a reconfigurable neural engine model, wherein the kernel instructions are executable by a compute tile of a data processing array to implement compute functions of the machine learning model; and compiling the second set of statements into microcontroller instructions based on a super-graph model; and a microcontroller configured to execute the microcontroller instructions to control operation of the data processing array in performing operations of the machine learning model.

9. The system of claim 8, wherein the compute tile is configured to execute a virtual machine, and wherein the virtual machine is configured to execute the kernel instructions to invoke one or more kernels of the compute tile.

10. The system of claim 8, wherein the microcontroller is configured to execute a virtual machine, and wherein the virtual machine is configured to execute the microcontroller instructions.

11. The system of claim 8, wherein the reconfigurable neural engine model specifies an instruction format for invoking a plurality of kernels executing in the compute tile.

12. The system of claim 8, wherein the super-graph model specifies data movement in the data processing array.

13. The system of claim 8, wherein the partitioning statements of the tensor-level intermediate representation comprises:

detecting compute intrinsic calls in the statements of the tensor-level intermediate representation; and including the compute intrinsic calls in the first set of statements.

14. The system of claim 13, wherein the partitioning statements of the tensor-level intermediate representation comprises:

detecting, in the tensor-level intermediate representation, loop constructs including a copy operation of data from one memory to another memory; and including the loop constructs in the second set of statements.

15. A computer program product, comprising:

one or more computer-readable storage media, and program instructions collectively stored on the one or more computer-readable storage media, wherein the program instructions are executable by computer hardware to initiate operations including:

compiling a machine learning model using kernel expressions into a tensor-level intermediate representation;

partitioning statements of the tensor-level intermediate representation into a first set of statements and a second set of statements;

compiling the first set of statements into kernel instructions based on a reconfigurable neural engine model, wherein the kernel instructions are executable by a compute tile of a data processing array to implement compute functions of the machine learning model; and compiling the second set of statements into microcontroller instructions based on a super-graph model; and executing, by a microcontroller, the microcontroller instructions to control operation of the data processing array in performing operations of the machine learning model.

16. The computer program product of claim 15, wherein the compute tile is configured to execute a virtual machine, and wherein the virtual machine is configured to execute the kernel instructions to invoke one or more kernels of the compute tile.

17. The computer program product of claim 15, wherein the microcontroller is configured to execute a virtual machine, and wherein the virtual machine is configured to execute the microcontroller instructions.

18. The computer program product of claim 15, wherein the reconfigurable neural engine model specifies an instruction format for invoking a plurality of kernels executing in the compute tile.

19. The computer program product of claim 15, wherein the super-graph model specifies data movement in the data processing array.

20. The computer program product of claim 15, wherein the partitioning statements of the tensor-level intermediate representation comprises:

detecting compute intrinsic calls in the statements of the tensor-level intermediate representation;

including the compute intrinsic calls in the first set of statements;

detecting, in the tensor-level intermediate representation, loop constructs including a copy operation of data from one memory to another memory; and including the loop constructs in the second set of statements.

* * * * *